United States Patent
Chiang

(10) Patent No.: US 9,819,703 B2
(45) Date of Patent: Nov. 14, 2017

(54) SIP SERVER WITH MULTIPLE IDENTIFIERS

(71) Applicant: T-Mobile USA, Inc., Bellevue, WA (US)

(72) Inventor: Hsin-FU Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 209 days.

(21) Appl. No.: 14/863,175

(22) Filed: Sep. 23, 2015

(65) Prior Publication Data

US 2017/0085455 A1 Mar. 23, 2017

(51) Int. Cl.
*H04L 29/06* (2006.01)
*H04L 12/24* (2006.01)
*H04L 29/12* (2006.01)

(52) U.S. Cl.
CPC ...... *H04L 65/1066* (2013.01); *H04L 41/0668* (2013.01); *H04L 61/1588* (2013.01); *H04L 61/305* (2013.01); *H04L 65/1006* (2013.01); *H04L 65/1016* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 9,124,646 B2* | 9/2015 | Rozinov | H04L 67/24 |
| 2005/0220095 A1* | 10/2005 | Narayanan | H04L 63/126 |
| | | | 370/389 |
| 2008/0215736 A1* | 9/2008 | Astrom | H04L 29/06027 |
| | | | 709/226 |
| 2009/0097398 A1 | 4/2009 | Belinchon Vergara et al. | |
| 2009/0161666 A1* | 6/2009 | Ku | H04L 29/1216 |
| | | | 370/356 |

(Continued)

FOREIGN PATENT DOCUMENTS

EP 2053873 4/2009

OTHER PUBLICATIONS

PCT Search Report and Written Opinion dated Jan. 2, 2017 for PCT Application No. PCT/US16/52427, 9 pages.

*Primary Examiner* — Thomas Dailey
(74) *Attorney, Agent, or Firm* — Lee & Hayes, PLLC

(57) ABSTRACT

A Session Initiation Protocol (SIP) server within an Internet Protocol Multimedia Subsystem (IMS) network may be associated with multiple, different identifiers. In some embodiments, a process for implementing the multiple, different identifiers of the SIP server within the IMS network may include maintaining, at a home subscriber server (HSS), a first identifier of a Session Initiation Protocol (SIP) server in association with a user, and inserting a second identifier of the SIP server in a message header of a SIP request during a wireless communication session of the user. In some embodiments, the first identifier of the SIP server may be transmitted over Diameter (Cx) interfaces, while the second identifier of the SIP server may be transmitted over SIP (ISC) interfaces. Using multiple identifiers of a SIP server allows for minimizing downtime while restoring the user's wireless communication session in the event of a failure of the SIP server.

16 Claims, 8 Drawing Sheets

(56) References Cited

U.S. PATENT DOCUMENTS

| | | | |
|---|---|---|---|
| 2010/0150143 A1* | 6/2010 | Ku | H04L 12/66 370/356 |
| 2010/0250680 A1* | 9/2010 | Bhatt | H04L 45/306 709/206 |
| 2010/0306397 A1 | 12/2010 | Belinchon Vergara et al. | |
| 2011/0142015 A1 | 6/2011 | Shaikh et al. | |
| 2011/0185070 A1* | 7/2011 | Xue | H04L 29/12066 709/227 |
| 2012/0143982 A1* | 6/2012 | Oster | H04M 7/0075 709/217 |
| 2014/0068710 A1 | 3/2014 | Lau et al. | |
| 2015/0172324 A1* | 6/2015 | Calme | H04L 65/1046 709/228 |

\* cited by examiner

SIP SERVER WITH MULTIPLE IDENTIFIERS

BACKGROUND

Internet Protocol Multimedia Subsystem (IMS) is an architectural framework defined by the 3$^{rd}$ Generation Partnership Project (3GPP) for delivering Internet Protocol (IP) multimedia to user equipment (UE) of the IMS network. An IMS core network (sometimes referred to as the "IMS core", the "Core Network (CN)," or the "IM CN Subsystem") permits wireless and wireline devices to access IP multimedia, messaging, and voice applications and services. IMS allows for peer-to-peer communications, as well as client-to-server communications over an IP-based network.

The IMS makes use of Session Initiation Protocol (SIP)—a signaling protocol that can be used to establish, modify, and terminate multimedia sessions (e.g., a multimedia telephony call) over packet networks, and to authenticate access to IMS-based services. The IMS core network may include various nodes that are configured to utilize SIP signaling for controlling and managing multimedia sessions of the IMS core network. Such nodes are referred to herein as "SIP Servers". FIG. 1 is a schematic diagram illustrating a portion of an example IMS network 100. The IMS network 100 is shown as including SIP servers in the form of Call Session Control Function (CSCF) nodes including an interrogating CSCF (I-CSCF) node 102 and multiple serving CSCF (S-CSCF) nodes 104(1), 104(2), . . . , 104(N) (collectively 104).

A UE may connect to the IMS network 100 through a radio access network (RAN), and may register with the IMS network 100 using a SIP REGISTER method, which is a mechanism for attaching to the IMS network 100. For simplicity, FIG. 1 illustrates a previous hop 106 to represent the node that ultimately receives the SIP REGISTER method from the UE prior its transmission to the I-CSCF node 102 along signaling path 108.

FIG. 1 further shows a home subscriber server (HSS) 110 that maintains a master database 112 containing mappings from UEs to corresponding S-CSCF nodes 104 that are designated for providing IMS-based services to the UEs. Specifically, the master database 112 of the HSS 110 may store fully qualified domain names (FQDMs) of each S-CSCF node 104 that is assigned to a UE through an IMS registration procedure. For example, if the I-CSCF node 102 selects S-CSCF node 104(1) to serve a particular UE associated with "User A", the S-CSCF node 104(1) receives a notification of this selection from the I-CSCF node 102 via signaling path 114, and the S-CSCF node 104(1) instructs the HSS 110, via signaling path 116, to update the master database 112 with the FQDM 118 for S-CSCF node 104(1) (e.g., an FQDM 118 such as "S-CSCF-104-1.sip.operator.com"). This creates a binding between the S-CSCF node 104(1) and User A.

Once the UE of User A is registered and assigned to S-CSCF node 104(1), all SIP signaling originating and terminating at the UE of User A will be routed through S-CSCF node 104(1). Furthermore, in order to ensure that the signaling path through S-CSCF node 104(1) remains open for the entirety of User A's session (as well as other sessions of other users who are assigned to S-CSCF node 104(1)), the S-CSCF node 104(1) adds its FQDM 118 (i.e., the same FQDM 118 stored in the master database 112 of the HSS 110) in a record-route header 120 of any new SIP message receives at S-CSCF 104(1) before forwarding the SIP message to the next hop 122 via signaling path 124.

When the S-CSCF node 104(1) fails (i.e., the S-CSCF node 104(1) is rendered inoperative), any new SIP traffic received at the I-CSCF node 102 from a UE that is assigned to the S-CSCF node 104(1) will be routed to the failed node without knowledge that the S-CSCF node 104(1) has failed. This is because the I-CSCF node 102, upon receiving such new SIP traffic, will query the HSS 110 via signaling path 126 to obtain, via signaling path 128, the FQDN 118 of the S-CSCF node 104(1) assigned to the UE, and then issue a query to a domain name system (DNS) server 130 via the signaling path 132 to obtain, via signaling path 134, the IP address of the S-CSCF node 104(1) corresponding to the FQDM 118. The I-CSCF node 102 then uses the IP address it obtained from the DNS server 130 as the address where SIP traffic from the assigned UE is to be forwarded along the signaling path 114.

In the above scenario, the I-CSCF node 102, upon sending SIP traffic to the S-CSCF node 104(1), will wait a timeout period that is configurable (anywhere from 10 to 30 seconds) for a response from S-CSCF node 104(1). If no response is received within the timeout period, the I-CSCF node 102 will refresh the IMS registration (or another relevant SIP request) for User A by initiating a procedure (e.g., a "capability discovery") to assign a different, available S-CSCF node 104 to the UE that is configured to restore User A's session and serve the UE for the remainder of the session. However, this timeout period is an undesirable amount of time to wait for session restoration, and it may cause various adverse consequences. For example, if User A is making a call and the S-CSCF node 104(1) fails, User A may not hear a ringtone for at least the timeout period. As another example, the UE associated with User A may lose its registration, and may be unaware that registration was lost, and there may be no way to notify the UE of the lost registration. This is especially true in coverage areas where a circuit switched (CS) network is unavailable, such as when the user is using Voice Over Long Term Evolution (VoLTE) to make a call in a "LTE-only" coverage area. Even when the user is not making a call, the UE carried by the user may be trying to register with the failed S-CSCF node 104(1), and this registration may be delayed by the same amount of time due to the above-mentioned timeout period for IMS restoration.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
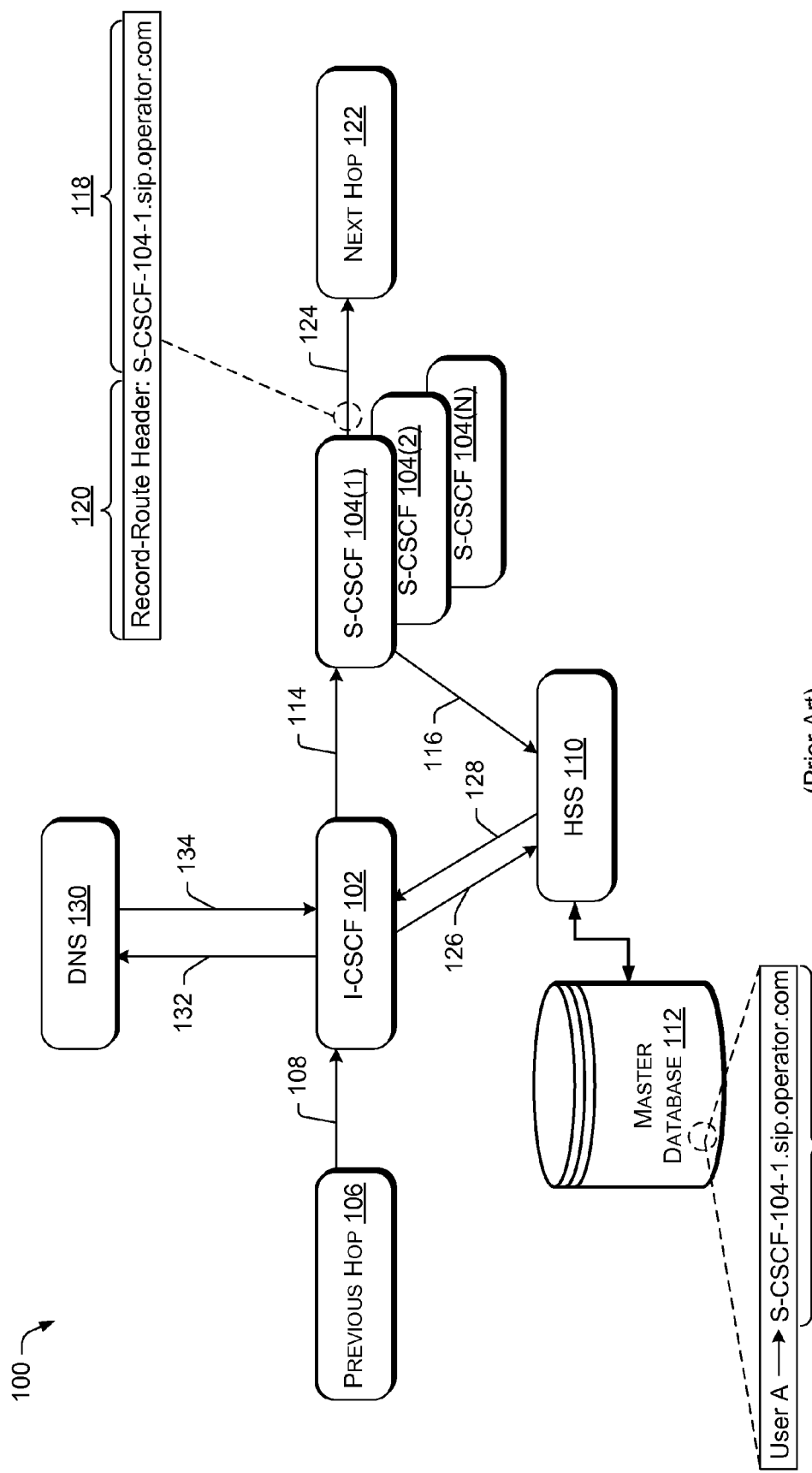
FIG. 1 is a schematic diagram illustrating a prior art implementation in an IMS network.

Described herein are techniques and systems for using multiple, different identifiers for individual Session Initiation Protocol (SIP) servers within an Internet Protocol Multimedia Subsystem (IMS) network. According to various embodiments, a SIP server within an IMS network may be associated with a first identifier and a second, different identifier that each identify the SIP server.

In some embodiments, the first identifier of the SIP server may be transmitted over Diameter (Cx) interfaces. For example, during an IMS registration procedure, the first identifier of the SIP server may be uploaded to a home subscriber server (HSS) over a Diameter interface so that the HSS may store the first identifier of the SIP server in association with a user as part of the IMS registration procedure. The second identifier of the SIP server may be transmitted over SIP (ISC) interfaces. For example, during a wireless communication session of a user, the second identifier of the SIP server may be inserted within a message header of a SIP request received at the SIP server to generate a modified SIP request, and the modified SIP request may be forwarded to a next node as part of the wireless communication session.

In some embodiments, a process for implementing multiple, different identifiers for a SIP server of an IMS network includes maintaining, at a home subscriber server (HSS), a first identifier of a Session Initiation Protocol (SIP) server in association with a user, and inserting a second identifier of the SIP server in a message header of a SIP request during a wireless communication session of the user. Also disclosed herein are systems comprising one or more processors and one or more memories, as well as non-transitory computer-readable media storing computer-executable instructions that, when executed, by one or more processors perform various acts and/or processes disclosed herein.

By utilizing multiple, different identifiers for a SIP server of an IMS network (i.e., a first identifier to be transmitted over Diameter (Cx) interfaces and a second identifier to be transmitted over SIP (ISC) interfaces), in the event that the SIP server fails, a user's session can be restored in a matter of milliseconds, as compared to the much longer 10 to 30 second timeout period experienced in current IMS networks when a SIP server fails. This increased speed in IMS session restoration is due to the fact that, for any new SIP traffic received from a registered UE of the IMS network, the first identifier stored at the HSS is utilized to query a traffic distribution server to obtain a forwarding address for the assigned SIP server. If the SIP server has failed, the query (which takes mere milliseconds to complete) will return NULL and cause a re-registration to a different, available SIP server in place of the failed one. Thus, the techniques and systems described herein shorten the session-restoration time period after failure of a SIP server.

Example Environment

Although the techniques and systems disclosed herein are predominantly described in the context of IMS restoration, this disclosure is not limited to using multiple identifiers for individual SIP servers for the purposes of IMS restoration. That is, the use of multiple identifiers of individual SIP servers may have other downstream applications, and IMS restoration is merely an illustrative example of how multiple SIP server identifiers can be used to reduce downtime while a session is restored due to a failed SIP server. For example, the use of multiple identifiers for individual SIP servers may accelerate shutdown procedures that wait for UEs on current sessions with the SIP server to leave before the SIP server is taken offline for maintenance. Other similar applications are contemplated herein, without limitation to the examples described for illustrative purposes.

Figure 2A:
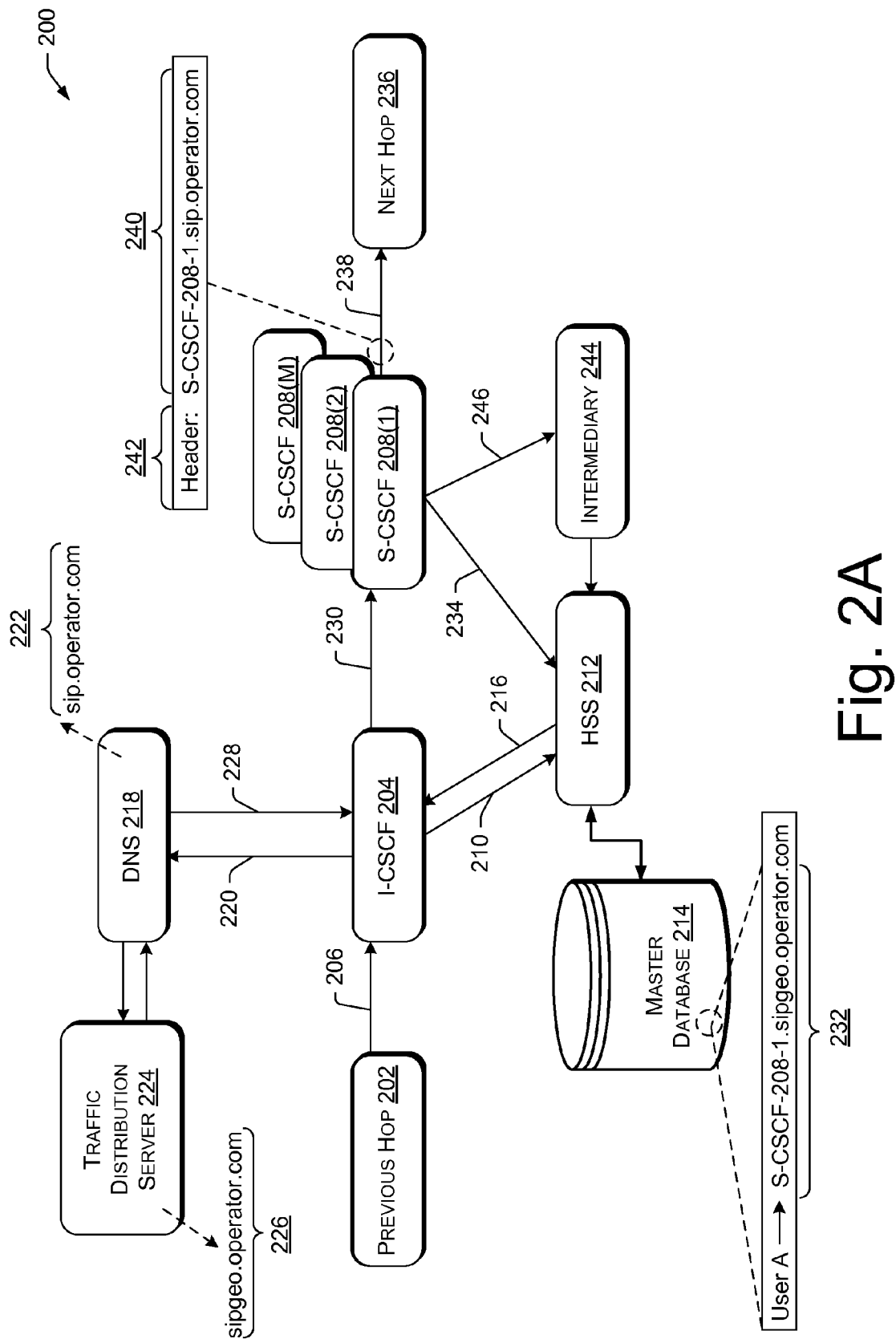
FIG. 2A is a schematic diagram illustrating a portion of an example IMS network according to various embodiments.

FIG. 2A is a schematic diagram illustrating a portion of an example IMS network 200. The IMS network 200 may be maintained and/or operated by one or more service providers, such as one or more wireless carriers ("operators"), that provide mobile IMS-based services to users (sometimes called "subscribers") who are associated with user equipment (UE). The IMS network 200 may represent any type of SIP-based network that is configured to handle/process SIP signaling packets or messages. In accordance with various embodiments described herein, the terms "user equipment (UE)", "wireless communication device," "wireless device," "communication device," "mobile device," and "client device," may be used interchangeably herein to describe any UE capable of transmitting/receiving data over the IMS network 200, perhaps in combination with other networks. Users may utilize their UEs to communicate with other users and devices via the IMS network 200, and/or to receive, provide, or otherwise interact with various different IMS-based services by accessing the IMS network 200. For example, a service provider may offer multimedia telephony services that allow a subscribed user to call or message other users via the IMS network 200. In this manner, an operator of the IMS network 200 may offer any type of IMS-based service, such as, telephony services, emergency services (e.g., E911), gaming services, instant messaging services, presence services, video conferencing services, social networking and sharing services, location-based services, push-to-talk services, and so on.

The IMS network 200 may enable peer-to-peer, client-to-client, and/or client-to-server, communications over wired and/or wireless networks using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Any given UE may be configured to register for, and thereafter access and utilize, one or more IMS-based services via the IMS network 200. To this end, the UE may be configured to transmit, via a radio access network (RAN), messages to the IMS network 200. For example, the UE may transmit messages to the IMS network 200 as part of an IMS registration procedure where the UE is requesting to register for an IMS-based service. SIP may be used for transmitting such messages. As used herein, a "SIP request" is a message that is sent from a UE to the IMS network 200 (or IMS core) using SIP protocol, and a "SIP response" is a message that is sent from the IMS network 200 (or IMS core) to a UE using SIP protocol. Accordingly, a SIP "REGISTER" method may be sent as a SIP request during an IMS registration procedure in order to request registration of a UE for an IMS-based service and to attach the UE to the IMS network 200.

For simplicity, FIG. 2A illustrates a previous hop 202 that represents a node (e.g., a proxy CSCF (P-CSCF) node) that ultimately receives the SIP REGISTER method from the UE prior its transmission to an interrogating CSCF (I-CSCF) node 204 along signaling path 206. The I-CSCF node 204 constitutes one possible type of "SIP server," as the term is used herein. A "SIP server" may comprise any network device that is configured to process SIP signaling packets or messages (e.g., SIP requests and/or SIP responses). The I-CSCF node 204 shown in FIG. 2 may represent one of a plurality of I-CSCF nodes within the IMS network 200. Prior to receipt of the SIP REGISTER method at the I-CSCF node 204, one or more components of the IMS network 200 may authenticate the user, such as by using credential validation, signature verification, and the like.

In response to receiving the SIP REGISTER method at the I-CSCF node 204, the I-CSCF node 204 may interrogate the SIP request by carrying out a procedure that allocates one of multiple serving CSCF (S-CSCF) nodes 208(1), 208(2), ..., 208(M) (collectively 208)—another type of SIP server configured to process SIP signaling packets—to the registering user. S-CSCF nodes 208 are sometimes referred to as "Registrars," and the process of allocating Registrars among users who are registering for IMS-based services is sometimes referred to as finding a "home CSCF" for the UE of the user.

The I-CSCF node 204 may initially query, via signaling path 210, a home subscriber server (HSS) 212 for information maintained in a master database 214 to enable the I-CSCF node 204 to determine a S-CSCF node 208 that is to serve the registering user. The information returned along signaling path 216 from the HSS 212 to the I-CSCF node 204 may indicate whether there is an S-CSCF node 208 that is currently assigned to the user. When the master database 214 includes an assignment of a S-CSCF node 208 to a user, such an assignment is sometimes referred to as an "S-CSCF binding". Moreover, the signaling paths 210 and 216 represent a Diameter (Cx) interface where messages transmitted along the signaling paths 210 and 216 may be transmitted using Diameter protocol, which is defined by the Internet Engineering Task Force (IETF) in RFC 6733.

When the I-CSCF node 204 receives information via the signaling path 216 indicating that there is no S-CSCF binding for a registering user, the I-CSCF node 204 may use domain name system (DNS) protocol to query a DNS server 218 via signaling path 220 for an IP address of an available S-CSCF node 208. The query may comprise an A-record query (or an AAAA-record query) to return an IP address (e.g., IPv4, IPv6, etc.) based on a domain name. The DNS server 218 may include one or more servers that are configured to translate text-based domain names into numerical IP addresses that can be used to route information in the IMS network 200. In some embodiments, the DNS server 218 may be associated with a domain 222, such as the "sip.operator.com" domain shown in FIG. 2A.

The DNS server 218 may further have access to a traffic distribution server 224 to determine one or more appropriate S-CSCF node 208 to allocate to a registering user from a pool of available S-CSCF nodes 208. In some embodiments, the traffic distribution server 224 may be associated with a domain 226 that is different from the domain 222 of the DNS server 218. FIG. 2A shows the domain 226 as comprising the "sipgeo.operator.com" domain. In some embodiments, the domain 226 of the traffic distribution server 224 may be a subdomain of the domain 222 of the DNS server 218, or vice versa.

The traffic distribution server 224 may use criteria for allocating one or more S-CSCF nodes 208 to registering users, and the criteria may include any suitable criteria, such as load balancing criteria and other service criteria. For example, the traffic distribution server 224 may have a preference for choosing S-CSCF nodes 208 that are experiencing less traffic or that have a lower processing load over S-CSCF nodes 208 that are overloaded or handling a high volume of network traffic.

Furthermore, in order to allocate S-CSCF nodes 208 that are fully operational, the traffic distribution server 224 may be configured to implement a health monitoring mechanism (e.g., a polling mechanism based on Simple Network Management Protocol (SNMP) GET polling or using SIP OPTION method, a push mechanism where the S-CSCF nodes 208 self-report any problems, etc.) to monitor the "health" (i.e., monitor for failure conditions or status) of SIP servers in the IMS network 200. For instance, individual SIP servers (e.g., individual S-CSCF nodes 208) may respond to polling from the traffic distribution server 224 with responses that are indicative of the following SIP server states: (i) the SIP server is operational, (ii) the SIP server is operational but overloaded, or (iii) the SIP server not operational and has failed. State (iii) may be indicated to the traffic distribution server 224 if the SIP server fails to respond to polling. If any given SIP server is determined to be in states (ii) or (iii), the traffic distribution server 224 may remove that S-CSCF node 208 from the pool of available S-CSCF nodes 208 (e.g., by disabling the IP address of the S-CSCF node 208) so that any subsequent DNS queries for S-CSCF allocation will avoid returning the IP address of an S-CSCF node 208 in states (ii) or (iii).

Ultimately, the DNS server 218, with the assistance of the traffic distribution server 224, may return, via signaling path 228, IP addresses of one or more S-CSCF nodes 208 that are available for selection by the I-CSCF node 204. For example, the DNS server 218 may discover that S-CSCF nodes 208(1), 208(2), and 208(3) are available for the registering user, and the I-CSCF node 204 may select a particular S-CSCF node 208, such as S-CSCF node 208(1), for assignment to the registering user.

In this example, with the S-CSCF node 208(1) selected, the I-CSCF node 204 may send a notification of the selection via signaling path 230 to S-CSCF node 208(1). In response to receiving the notification, the S-CSCF node 208(1) may upload, or otherwise transmit, a first identifier 232 to the HSS 212 via signaling path 234 (i.e., over a Diameter (Cx) interface). Referring to the registering user as "User A," in this example, the first identifier 232 is then stored in the master database 214 where User A is mapped to the first identifier 232 of the S-CSCF node 208(1). This uploading step is sometimes referred to as "updating the HSS server name" with the first identifier 232. Although the master database 214 of the HSS 212 is shown as storing the first identifier 232 in association with User A, it is to be appreciated that the HSS 212 may store additional information regarding SIP servers and users, such as IP addresses, session states, and so on.

The first identifier 232 may be one of multiple (e.g., two) identifiers associated with the S-CSCF node 208(1), the multiple identifiers being different from each other. Furthermore, the S-CSCF nodes 208 may store the multiple, different identifiers in memory along with computer-executable instructions that cause selection of the first identifier 232 for transmission whenever an identifier is to be transmitted over Diameter interfaces (i.e., "at the Diameter level"). The interface to the HSS 212 via the signaling path 234 represents a Diameter interface.

The first identifier 232 may generally comprise a piece of information and/or data that is used to uniquely identify the S-CSCF node 208(1). Accordingly, each S-CSCF node 208 may have its own first identifier 232 that uniquely identifies the individual S-CSCF node 208, and that may be transmitted or uploaded at the Diameter level. The first identifier 232 may comprise any suitable type of identifier, such as an identifier including, without limitation, a hostname of the S-CSCF node 208(1), a fully qualified domain name (FQDN) of the S-CSCF node 208(1), an IP address of the S-CSCF node 208(1), or any other similar type of identifier. FIG. 2A shows the first identifier 232 as comprising a FQDN of the S-CSCF node 208(1) in the form of "S-CSCF-208-1.sipgeo.operator.com". In some embodiments, the first identifier 232 may comprise a FQDN corresponding to the domain 226 associated with the traffic distribution server 224.

Storage of the first identifier 232 in the master database 214 in association with User A creates a binding between the S-CSCF node 208(1) and User A, which means that User A is now registered with the IMS network 200. Subsequently, all SIP signaling originating and terminating at the UE of User A is routed through S-CSCF node 208(1), unless the S-CSCF node 208(1) fails. Unless and until the S-CSCF node 208(1) fails, a SIP request received at S-CSCF node 208(1) during a wireless communication session of User A may be processed by the S-CSCF node 208(1) and subsequently forwarded to the next hop 236 along signaling path 238. The processing of a SIP request by the S-CSCF node 208(1) may include inserting a second identifier 240 of the S-CSCF node 208(1) within a message header 242 (e.g., a record-route header) of the SIP request that does not already include the second identifier 240 in the message header 242. In other words, the S-CSCF nodes 208, or another suitable network device in the IMS network 200, may be configured with computer-executable instructions to write the second identifier 240 at the "SIP level" (i.e., over SIP (ISC) interfaces). In the example of FIG. 2, writing the second identifier 240 in the message header 242 of a SIP request is performed over a SIP (ISC) interface.

Writing the second identifier 240 in the message header 242 before forwarding the SIP request to the next hop 236 is performed so that a return path to User A will also go through S-CSCF node 208(1), and so that a session is not interrupted when the operator desires to perform maintenance on the S-CSCF node 208(1) or when the S-CSCF node 208(1) is overloaded. For example, when the S-CSCF node 208(1) is scheduled for maintenance or is overloaded, the traffic distribution server 224 may takes the S-CSCF node 208(1) out of rotation for consideration in allocating it to new registering users. In this manner, when a new DNS query for an initial SIP REGISTER method is received at the DNS server 218, the S-CSCF node 208(1) is not included in the pool of returned IP addresses. A shutdown procedure may proceed for the S-CSCF node 208(1) where each UE on a session involving the S-CSCF node 208(1) periodically re-register (e.g., refresh its registration) to get reassigned to a different S-CSCF node 208. This is done for every UE on a session involving the S-CSCF node 208(1) until the last UE is re-registered. After checking the master database 214 to ensure there are no UEs assigned to S-CSCF node 208(1), the S-CSCF node 208(1) may be taken offline for maintenance. This shutdown procedure relies on the insertion of the second identifier 240 to minimize the service impact to the users on the IMS network 200.

The second identifier 240 that is inserted into the message header 242 of a SIP request is different from the first identifier 232 stored in the master database 214 of the HSS 212. To this end, the second identifier 240 may comprise any suitable type of identifier, such as an identifier including, without limitation, a hostname of the S-CSCF node 208(1), a fully qualified domain name (FQDN) of the S-CSCF node 208(1), an IP address of the S-CSCF node 208(1), or any other similar type of identifier, so long as the second identifier 240 is different from the first identifier 232 in some way. For example, the second identifier 240 may be of the same identifier type as the first identifier 232 (e.g., both identifiers 232 and 240 may comprise FQDNs), but the second identifier 240 may include a value that distinguishes it from the first identifier 232. This scenario is illustrated in FIG. 2A by the fact that the second identifier 240 comprises "S-CSCF-208-1.sip.operator.com," corresponding to the domain 222 of the DNS server 218 (e.g., "sip.operator.com"), while the first identifier 232 corresponds to the domain 226 of the traffic distribution server 224 (e.g., "sipgeo.operator.com"). In this example, the values "sip" and "sipgeo" of the respective FQDNs of each identifier are different, thereby distinguishing the two identifiers. In another example, the second identifier 240 may additionally, or alternatively, differ from the first identifier 232 by the type of identifier (e.g., the second identifier 240 may comprise an IP address of the S-CSCF node 208(1) while the first identifier 232 may comprise a FQDN of the S-CSCF node 208(1).

In some embodiments, the S-CSCF nodes 208 may include computer-executable instructions stored in memory of the S-CSCF nodes 208 that cause transmission of a single identifier in all instances, regardless of the type of interface the identifier is to be transmitted over. For example, each S-CSCF node 208 may transmit its respective second identifier 240 over both Diameter interfaces (i.e., at the Diameter level) and SIP interfaces (i.e., at the SIP level). In this embodiment, the transmission of the second identifier 240 may be intercepted by an intermediary network device 244 ("intermediary 244") where it is converted to a different identifier (e.g., the first identifier 232) before being forwarded to the intended destination. For example, instead of the S-CSCF node 208(1) uploading the first identifier 232 via the signaling path 234, as described above, the S-CSCF node 208(1) may alternatively upload the second identifier 240 via signaling path 246 to the intermediary 244. The transmission over the signaling path 246 may be a Diameter level transmission. For example, the intermediary 244 may comprise a diameter relay agent (DRA) that is responsible for routing or relaying Diameter signaling messages to Diameter nodes, such as the HSS 212. In this scenario, the intermediary 244 may store computer-executable instructions that, when executed by one or more processors of the intermediary 244, cause the received second identifier 240 to be converted into the first identifier 232 (e.g., by swapping values included in the identifier (e.g., replacing "sip" with "sipgeo" in the FQDNs shown in FIG. 2A)). The intermediary 244 may then forward the first identifier 232 to the HSS 212 over a Diameter interface. Accordingly, the techniques described herein may be implemented in any existing S-CSCF node 208(1) that is configured to transmit a single identifier at both the Diameter and SIP level without changing the configuration of the S-CSCF node 208(1).

Figure 2B:
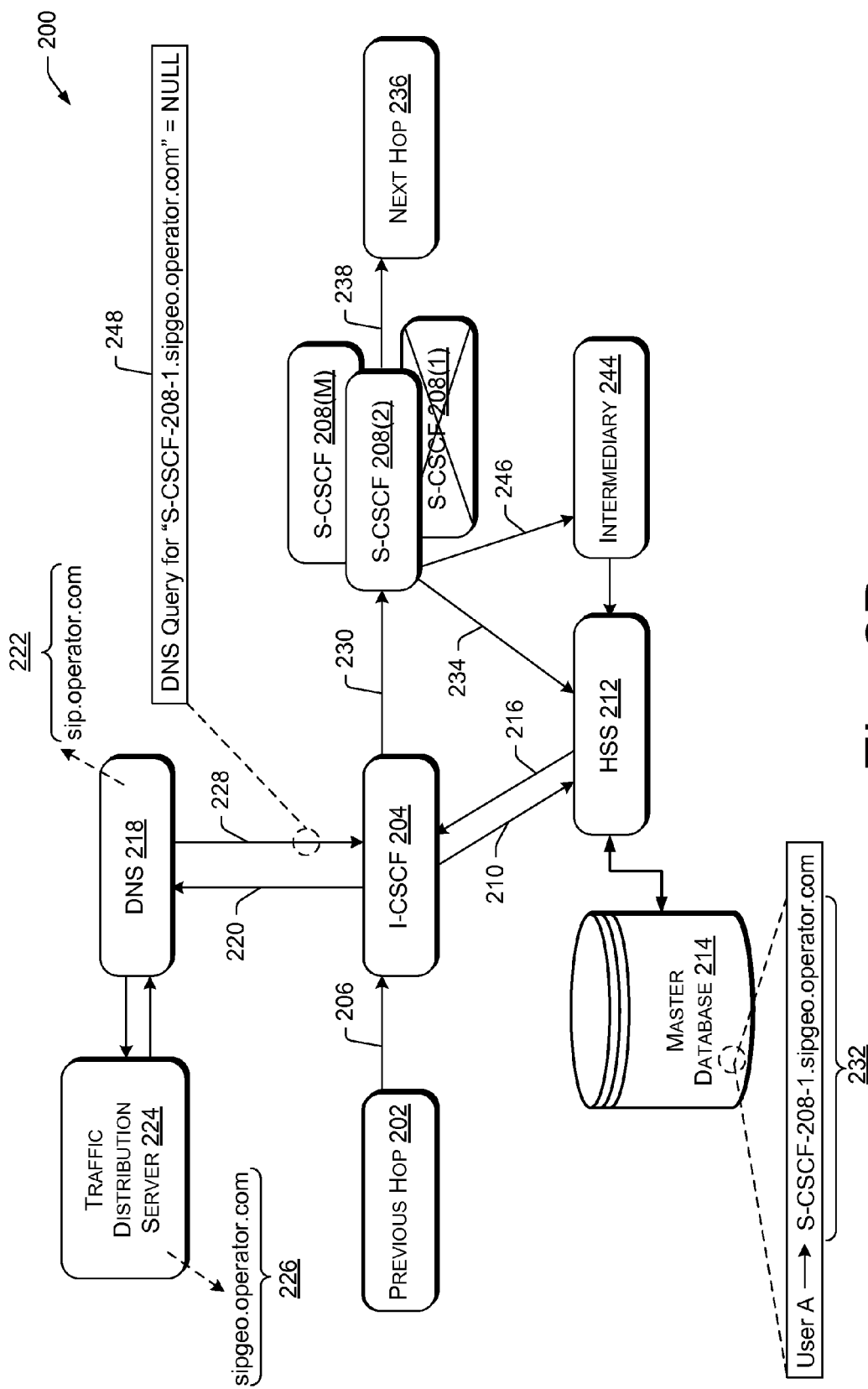
FIG. 2B is a schematic diagram illustrating the portion of the example IMS network of FIG. 2A after failure of a SIP server.

FIG. 2B is a schematic diagram illustrating the portion of the example IMS network 200 of FIG. 2A after failure of a SIP server, such as the S-CSCF node 208(1). In the example of FIG. 2B, the S-CSCF node 208(1) may have experienced a network failure, or some other failure in hardware and/or software of the SIP server that renders the SIP server inoperative in processing SIP signaling packets. Failure of the SIP server, in this example, may be distinguished from the SIP server being in an overloaded state (i.e., state (ii), as described above) in that the SIP server may not respond to polling from the traffic distribution server 224, or may fail to self-report in a push-based health monitoring scheme.

When the S-CSCF node 208(1) has failed, as is shown in FIG. 2B, the traffic distribution server 224 determines the failure state, such as by polling S-CSCF node 208(1) and failing to receive a response from the S-CSCF node 208(1). In response to determining that the S-CSCF node 208(1) has failed, the traffic distribution server 224 takes the S-CSCF node 208(1) out of rotation in the pool of available S-CSCF nodes 208 that can be allocated to registering Users.

Continuing with the previous example that User A is registered and assigned the S-CSCF node 208(1), any new SIP traffic (e.g., a SIP request) received at I-CSCF node 204 causes the I-CSCF node 204 to query the HSS 212 for the identifier of the S-CSCF node assigned to User A, which returns the first identifier 232 retrieved from the master database 214. The I-CSCF node 204 may use the first identifier 232 to query the DNS server 218 along signaling path 220 for an IP address of the S-CSCF node 208 corresponding to the first identifier 232. Upon receipt of the DNS query, the DNS server 218 may access the traffic distribution server 224 to determine that the S-CSCF node 208(1) corresponding to the first identifier 232 has been taken out of the rotation by the traffic distribution server 224, which causes the DNS server 218 to return a "NULL" response 248 along signaling path 228, which indicates that the S-CSCF node 208(1) has been taken out of rotation (e.g., due to failure). Notably, the DNS query and NULL response 248 takes a matter of milliseconds to complete.

Receipt of the NULL response 248 at the I-CSCF node 204 causes the I-CSCF node 204 to re-register User A by initiating a capability discovery for an initial S-CSCF node 208 assignment procedure. In this manner, a different, available S-CSCF node 208, such as S-CSCF node 208(2), may be assigned to User A to restore User A's session. In this example, User A's session can be restored in a matter of milliseconds by discovering the node failure through a DNS query. In some embodiments, re-registration may pertain to a SIP dialog that includes a unique CALL-ID.

In some embodiments, the previous state of User A's session prior to the failure of S-CSCF node 208(1) may be recovered from the master database 214 of the HSS 212 so that User A's session can resume from where it left off using S-CSCF node 208(2). In response to receiving the NULL response, the assignment process of the S-CSCF node 208(2) to User A may be similar to that described above with respect to FIG. 2A when User A was originally assigned to S-CSCF node 208(1). Accordingly, the new assignment to S-CSCF node 208(2) is updated in the master database 214 by storing a first identifier 232 of the S-CSCF node 208(2) in association with User A therein, and any subsequent SIP traffic received at the S-CSCF node 208(2) causes the S-CSCF node 208(2) to insert a second identifier 240 in a message header 242 of the SIP message before forwarding the SIP message to the next hop 236.

Figure 3:
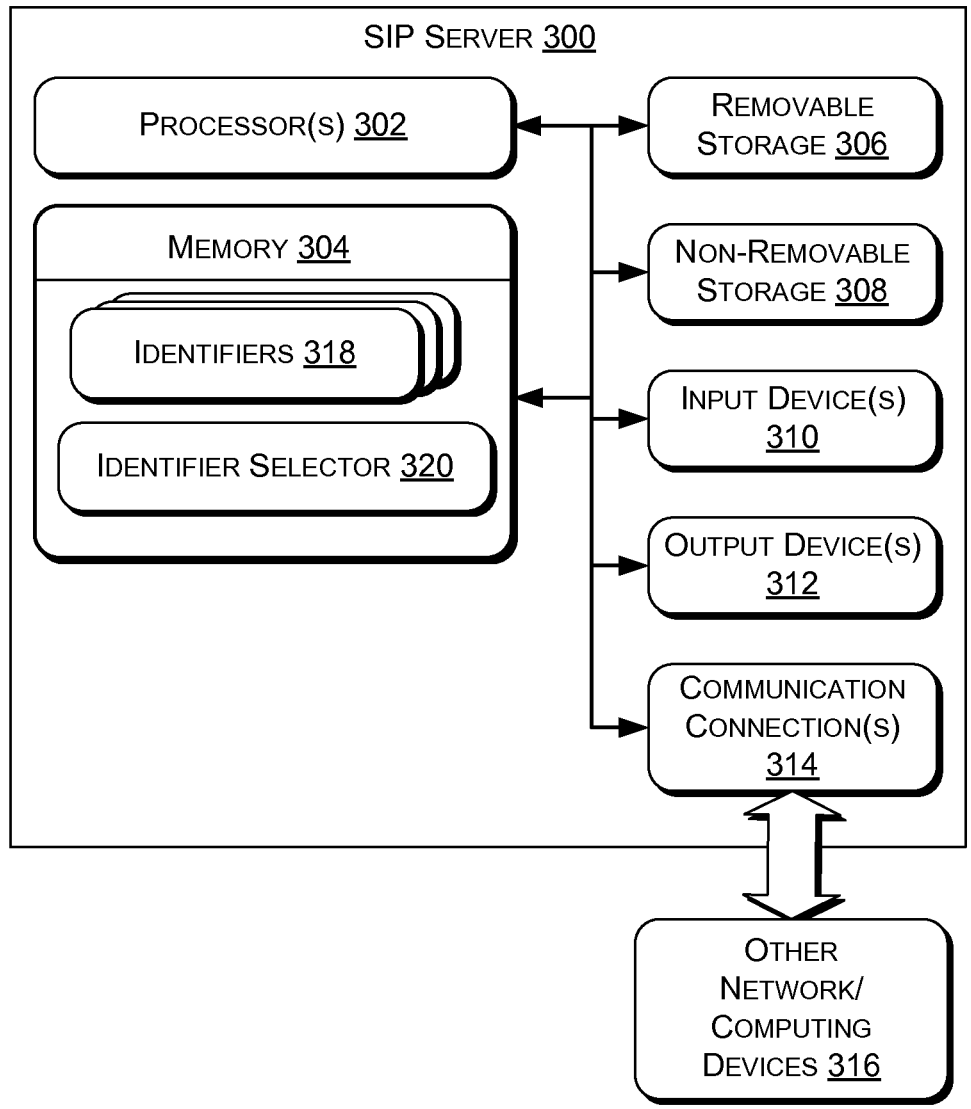
FIG. 3 is a block diagram of an example SIP server architecture in accordance with various embodiments.

FIG. 3 is a block diagram of an example SIP server 300 architecture in accordance with various embodiments. The SIP server(s) 300 may be representative of an individual S-CSCF node 208 of FIGS. 2A and 2B. In some embodiments, the SIP server 300 may represent the I-CSCF node 204 of FIGS. 2A and 2B. As shown, the SIP server 300 may include one or more processors 302 and one or more forms of computer-readable memory 304. The SIP server 300 may also include additional storage devices. Such additional storage may include removable storage 306 and/or non-removable storage 308.

The SIP server 300 may further include input devices 310 and output devices 312 communicatively to the processor(s) 302 and the computer-readable memory 304. The SIP server 300 may further include communications connection(s) 314 that allow the SIP server 300 to communicate with other network/computing devices 316 such as via a network. The communications connection(s) 314 may facilitate transmitting and receiving wired and/or wireless signals over any suitable communications/data technology, standard, or protocol, as described herein.

In various embodiments, the computer-readable memory 304 generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 304 may also be described as computer storage media and may include volatile and nonvolatile, removable and non-removable media implemented in any method or technology for storage of information, such as computer readable instructions, data structures, program modules, or other data. Computer-readable memory 304, removable storage 306 and non-removable storage 308 are all examples of computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the SIP server 300. Any such computer-readable storage media may be part of the SIP server 300.

In some embodiments, the SIP server 300 may store one or more identifiers 318, such as the first identifier 232 and/or the second identifier 240 introduced in FIG. 2A, in the memory 304, such as the first identifier 232 and the second identifier 240, that each uniquely identify the SIP server 300, as described herein. For example, an individual identifier 318 may comprise an FQDN of the SIP server 300.

In the case where the memory 304 stores multiple, different identifiers 318, the computer-readable memory 304 may further include an identifier selector 320 to select one of the identifiers 318 based on various criteria when transmitting or uploading an identifier 318 to another network device 316, such as the HSS 212. For example, the identifier selector 320 may determine the type of interface (e.g., Diameter (Cx), SIP (ISC), and so on) that the identifier 318 is to be transmitted over, and based on the type of interface, select an appropriate identifier 318 for transmission. For example, the identifier selector 320 may select the first identifier 232 when it is determined that an identifier 318 is to be transmitted over a Diameter interface, whereas the identifier selector 320 may select the second identifier 240 when it is determined that an identifier 318 is to be transmitted over a SIP interface.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
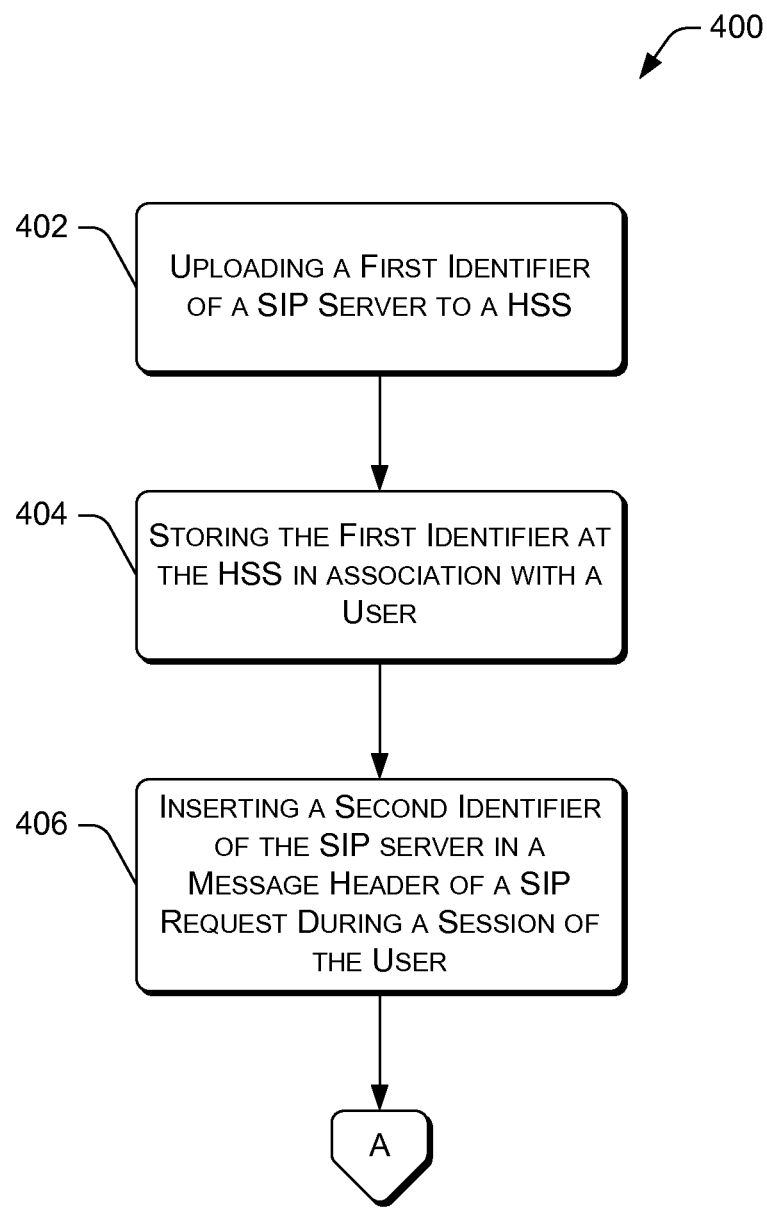
FIG. 4 illustrates a flowchart of an example process for using multiple identifiers for a SIP server within an IMS network.

FIG. 4 illustrates a flowchart of an example process 400 for using multiple identifiers 318 for a SIP server 300 within an IMS network 200. In describing the process 400, reference is made to the components shown in FIGS. 2A and 2B, as well as the SIP server 300 architecture of FIG. 3.

At 402, a first identifier 232 of a SIP server 300 (e.g., one of the S-CSCF nodes 208) may be uploaded to the HSS 212 for storage at the HSS 212 in association with a user (e.g., User A). The uploading at 402 may be performed by the SIP server 300, or by the intermediary network device 244 (e.g., a proxy node or DRA) after receiving a different identifier 318 from the SIP server 300 and converting it to the first identifier 232 for upload to the HSS 212. In some embodiments, the uploading at 402 is performed as part of an IMS registration procedure, such as when a UE of the user is registering for an IMS-based service (e.g., telephony services) with the IMS network 200. For example, the uploading may be performed in response to receiving a SIP message (e.g., any type of SIP request, such as a SIP REGISTER method, a SIP INVITE, a SIP SUBSCRIBE method, or any other SIP method) at an I-CSCF node 204, determining a SIP server 300 (e.g., a S-CSCF node 208) to be associated with a user (e.g., User A), and selecting, by the I-CSCF node 204, the SIP server 300 to serve the user.

At 404, the HSS 212, upon receipt of the first identifier 232, may maintain the first identifier 232 in storage (e.g., within the master database 214) and in association with a registered user (e.g., User A in FIGS. 2A and 2B).

At 406, a second identifier 240 of the SIP server 300 may be inserted in a message header 242 (e.g., a record-route header) of a SIP request that is received during a wireless communication session (e.g., a call) of the user on the IMS network 200.

Upon carrying out the process 400, in the event of a failure of the SIP server 300, a wireless communication session of a user assigned to the SIP server 300 may be restored in a matter of milliseconds, as compared to waiting a much longer timeout period. This increased speed in IMS session restoration is due to the fact that, for any new SIP traffic received from the UE of the registered user, the first identifier 232 stored at the HSS 212 is utilized to query the traffic distribution server 224 to obtain a forwarding (IP) address for the assigned SIP server, and, because the SIP server 300 has failed, the query (which takes mere milliseconds to complete) will return NULL and cause a re-registration to a different, available SIP server 300 in place of the failed one.

Figure 5:
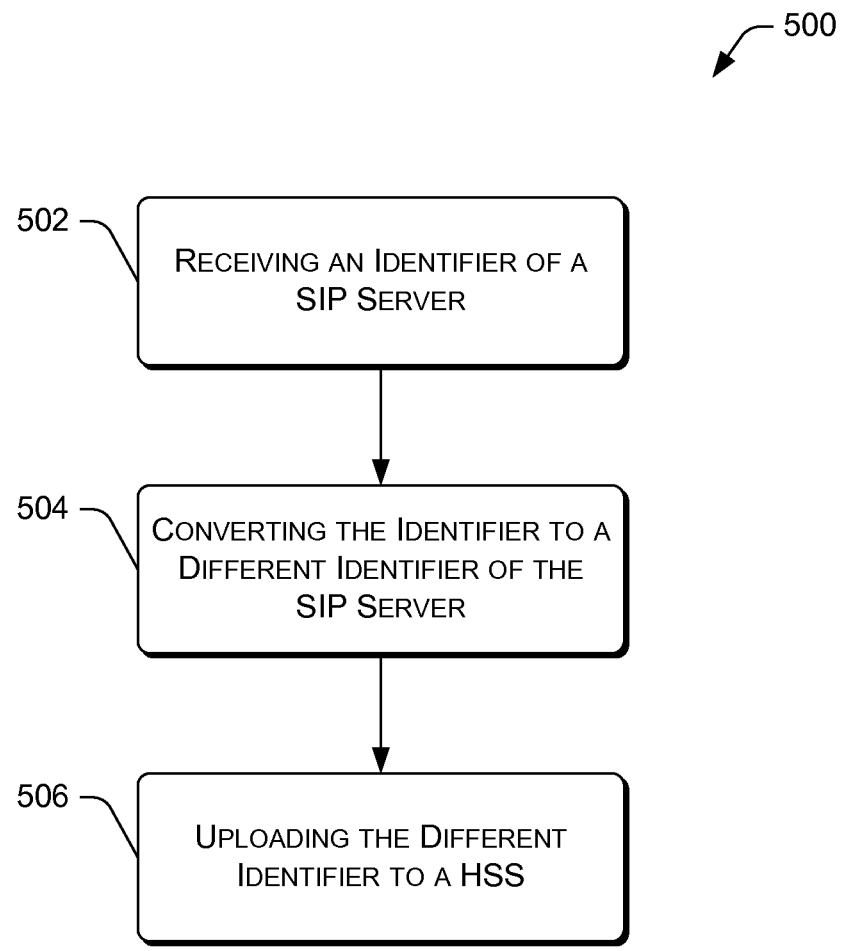
FIG. 5 illustrates a flowchart of an example process for converting an identifier of a SIP server to a different identifier prior to its transmission to a HSS.

FIG. 5 illustrates a flowchart of an example process 500 for converting an identifier 318 of a SIP server 300 to a different identifier 318 prior to its transmission to a HSS 212. In describing the process 500, reference is made to the components shown in FIGS. 2A and 2B, as well as the SIP server 300 architecture of FIG. 3.

At 502, an identifier 318 of a SIP server 300, such as the second identifier 240 of FIG. 2A, may be received at a network device. In some embodiments, the network device that receives the identifier 318 of the SIP server 300 at step 502 may comprise an intermediary network device 244 that is communicatively coupled between the SIP server 300 and an HSS 212.

At 504, the network device may convert the received identifier 318 (e.g., the second identifier 240) to a different identifier 318 of the SIP server 300, such as the first identifier 232 of the SIP server 300. Converting one identifier 318 to another, different identifier 318 of the same SIP server 300 may include replacing a value included in the received identifier 318 with a different value (e.g., replacing "sip" in the second FQDN identifier 240 with "sipgeo").

At 506, the different identifier 318 (e.g., the first identifier 232) of the SIP server 300 may be uploaded to the HSS 212 for storage at the HSS 212 in association with a user (e.g., User A). The uploading at step 506 may be similar to the uploading step 402 of the process 400.

Figure 6:
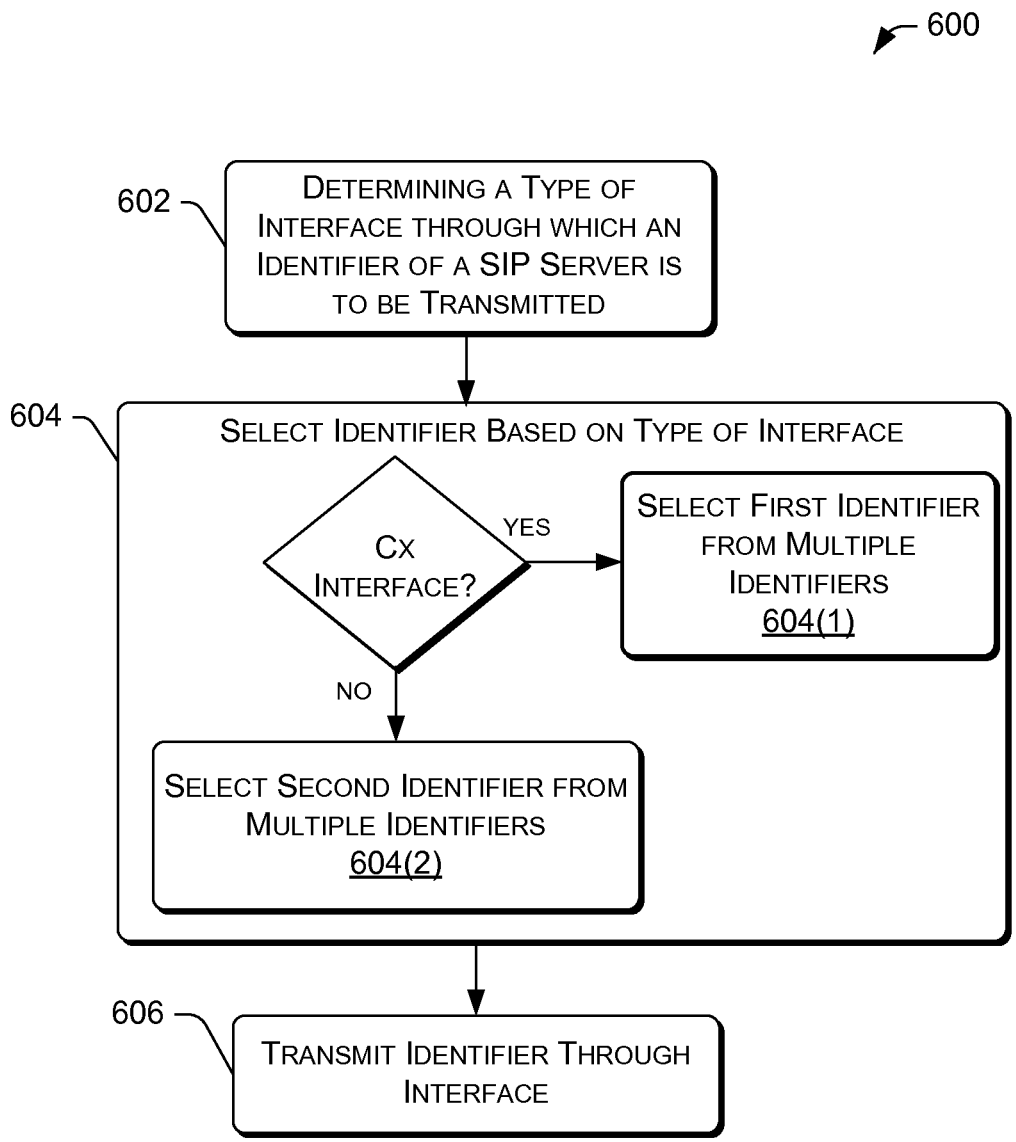
FIG. 6 illustrates a flowchart of an example process for selecting a particular identifier of a SIP server for transmission based on a type of interface through which the identifier is to be transmitted.

FIG. 6 illustrates a flowchart of an example process 600 for selecting a particular identifier 318 of a SIP server 300 for transmission based on a type of interface through which the identifier 318 is to be transmitted. In describing the process 600, reference is made to the components shown in FIGS. 2A and 2B, as well as the SIP server 300 architecture of FIG. 3.

At 602, the identifier selector 320 of the SIP server 300 may determine a type of interface (e.g., Diameter (Cx), SIP (ISC), etc.) through which an identifier 318 of the SIP server 300 is to be transmitted. For example, during an IMS registration process, the SIP server 300 may be configured to transmit an identifier 318 of the SIP server 300 to the HSS 212 over a Diameter interface. Meanwhile, during a wireless communication session of a user, the SIP server 300 may be configured to transmit an identifier 318 of the SIP server 300 through a SIP interface to be written in a message header of a SIP request. The determination of the type of interface at 602 may be based on knowledge of an intended destination for the identifier 318, or based on other information known to the SIP server 300.

At 604, the identifier selector 320 may select one of multiple identifiers 318 based at least in part on the type of interface determined at 602. If, the interface determined at 602 is a Diameter (Cx) interface, the process 600 may proceed along the "yes" route to 604(1) where a first identifier 232 is selected from multiple identifiers 318 of the SIP server 300. In some embodiments, the first identifier 232 may comprise a FQDN of the SIP server 300 that corresponds to the domain 226 of the traffic distribution server 224 of FIGS. 2A and 2B. If the interface determined at 602 is not a Diameter interface (e.g., the interface is a SIP (ISC) interface), the process 600 may proceed along the "no" route to 604(2) where a second identifier 240 is selected from multiple identifiers 318 of the SIP server 300. The second identifier 240 is different from the first identifier 232 as described herein, and may comprise a FQDN of the SIP server 300 that corresponds to the domain 222 of the DNS server 218 of FIGS. 2A and 2B.

At 606, the selected identifier 318 may be transmitted through the interface. For example, if the interface was determined at 602 to be a Diameter interface, the first identifier 232 may be uploaded to a network device (e.g., a HSS 212) through the Diameter interface. If, on the other hand, the interface was determined at 602 to be a SIP interface, the second identifier 240 may be inserted into a message header 242 of a SIP request via the SIP interface.

Figure 7:
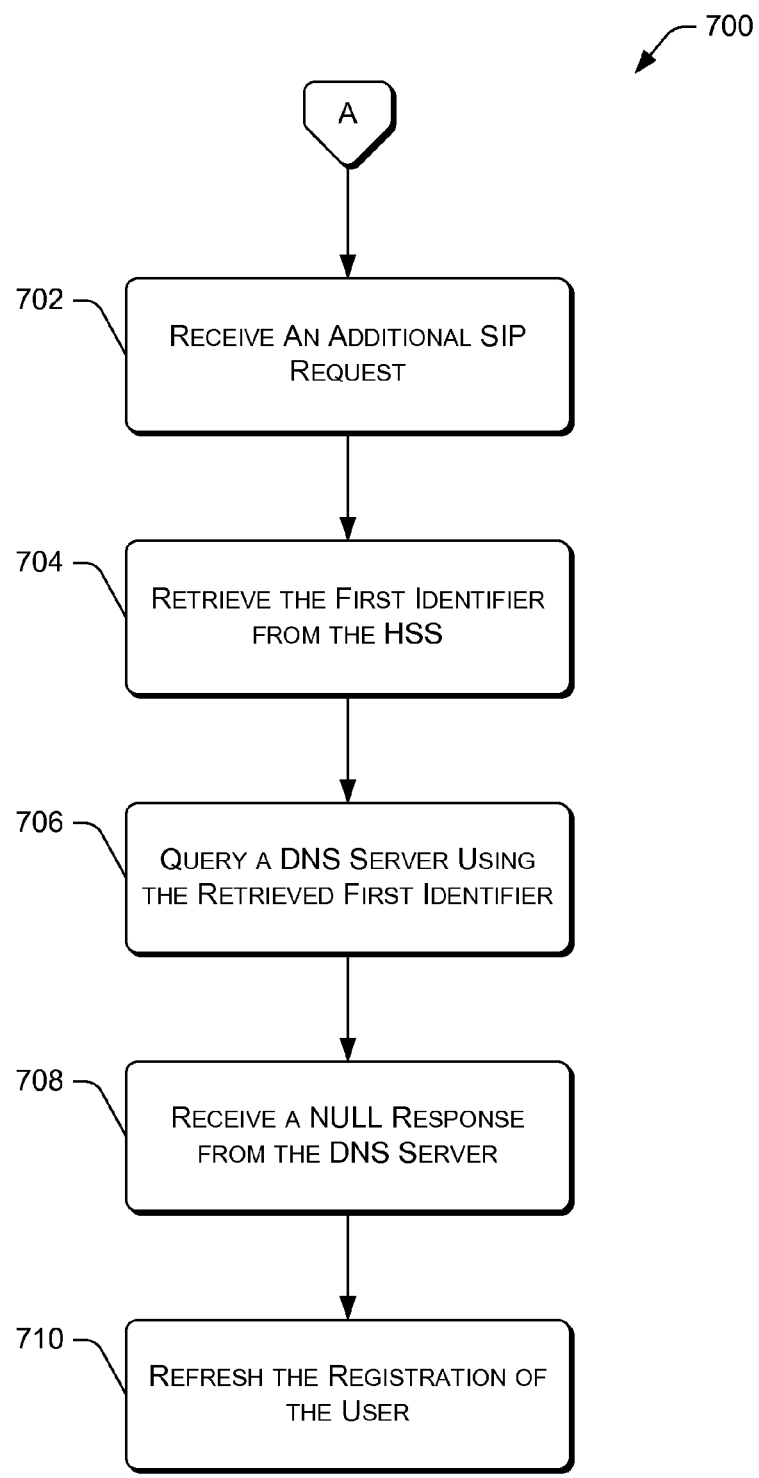
FIG. 7 illustrates a flowchart of an example process for restoring a wireless communication session of a user.

FIG. 7 illustrates a flowchart of an example process 700 for restoring a wireless communication session of a user. The process 700 may continue from step 406 of the process 400 shown in FIG. 4, as denoted by the off-page reference "A" in FIGS. 4 and 7.

At 702, the I-CSCF node 204 may receive an additional SIP request as part of a wireless communication session of the user associated with the SIP server 300 (e.g., one of the S-CSCF nodes 208) discussed with reference to the process 400 of FIG. 4 (e.g., User A). The SIP request received at 702 may comprise a SIP INVITE method, a SIP SUBSCRIBE method, or any similar SIP request that may be transmitted via a SIP signaling packet as part of a wireless communication session of User A.

At 704, the I-CSCF node 204 may query the HSS 212 to retrieve an identifier of the SIP server 300 assigned User A; in this case, the first identifier 232 stored in the master database 214 of the HSS 212.

At 706, the I-CSCF node 204 may query, using DNS protocol, the DNS server 218 using the first identifier 232 of the SIP server 300 it retrieved from the HSS 212. The DNS server 218 may receive the DNS query with the first identifier 232 in the form of a FQDN corresponding to the domain of the traffic distribution server 224. This may cause the DNS server 218 to access the traffic distribution server 224 for information as to the "health" (e.g., failure condition) of the assigned SIP server 300. If the traffic distribution server 224 has removed the assigned SIP server 300 from the rotation (e.g., due to failure of the SIP server 300), the DNS server 218 can obtain such information by accessing the traffic distribution server 224.

At 708, in the event that the assigned SIP server 300 associated with the first identifier 232 has failed, the I-CSCF node 204 receives a NULL response from the DNS server 218, which is indicative of the failed condition of the SIP server 300.

At 710, the I-CSCF node 204 may re-register User A by initiating capabilities discovery, querying the DNS server 218 for available S-CSCF nodes 208, and assigning a different, operational SIP server 300 to User A, thereby restoring the wireless communication session of User A in a matter of milliseconds.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A computer-implemented method comprising:
   receiving a Session Initiation Protocol (SIP) message;
   determining a SIP server for a user associated with the SIP message;
   storing a first identifier of the SIP server in a home subscriber server (HSS); and
   inserting a second identifier of the SIP server in a message header of the SIP message,
   wherein the first identifier of the SIP server comprises a first fully qualified domain name (FQDN) of the SIP server, and the second identifier of the SIP server comprises a second FQDN of the SIP server, and
   wherein the first FQDN of the SIP server corresponds to a domain associated with a traffic distribution server that is configured to allocate SIP servers among registered users of an Internet Protocol Multimedia Subsystem (IMS).

2. The computer-implemented method of claim 1, further comprising, prior to the storing the first identifier:
   receiving, at an intermediary network device, the second identifier of the SIP server; and
   converting, at the intermediary network device, the second identifier of the SIP server to the first identifier of the SIP server, wherein the storing the first identifier of the SIP server in the HSS comprises uploading the first identifier of the SIP server from the intermediary network device to the HSS.

3. The computer-implemented method of claim 1, wherein the SIP server comprises a serving call session control function (S-CSCF) node.

4. The computer-implemented method of claim 1, further comprising:
   receiving an additional SIP message;
   retrieving the first FQDN from the HSS;
   querying a domain name system (DNS) server using the first FQDN;
   receiving a NULL response from the DNS server, the NULL response being indicative of a failure of the SIP server; and
   in response to receiving the NULL response, re-registering the user in order to assign a new SIP server and to restore a wireless communication session.

5. The computer-implemented method of claim 1, further comprising, prior to the storing the first identifier:
   determining that one of the first identifier or the second identifier is to be transmitted over a Diameter interface to the HSS; and
   selecting the first identifier of the SIP server for transmission to the HSS based at least in part on the Diameter interface.

6. One or more non-transitory computer-readable media storing computer-executable instructions that, when executed, cause one or more communication devices to perform acts comprising:
   receiving a Session Initiation Protocol (SIP) message associated with a user;
   retrieving, from a home subscriber server (HSS), a first identifier of a SIP server that is associated with the user;
   determining the SIP server associated with the first identifier;
   sending the SIP message to the SIP server; and
   inserting a second ID of the SIP server in a message header of the SIP message,
   the first identifier of the SIP server comprises a first fully qualified domain name (FQDN) of the SIP server, the first FQDN corresponding to a domain associated with a traffic distribution server that is configured to monitor SIP servers of an IMS for failure conditions, and
   the second identifier of the SIP server comprises a second FQDN of the SIP server, the second FQDN corresponding to a domain associated with a domain name system (DNS) server that is configured to translate domain names into numerical Internet Protocol (IP) addresses.

7. The one or more non-transitory computer-readable media of claim 6, the acts further comprising, prior to the receiving the SIP message, storing the first identifier of the SIP server in the HSS as part of an Internet Protocol Multimedia Subsystem (IMS) registration procedure.

8. The one or more non-transitory computer-readable media of claim 7, the acts further comprising, prior to the storing the first identifier, selecting the first identifier for transmission to the HSS based at least in part on a determination that the transmitting is to occur over a Diameter interface.

9. The one or more non-transitory computer-readable media of claim 7, the acts further comprising, during the IMS registration procedure, and prior to the transmitting:
   receiving the second identifier of the SIP server;
   converting the second identifier of the SIP server to the first identifier of the SIP server that is transmitted to the HSS as part of the IMS registration procedure.

10. A system comprising:
   one or more processors; and
   memory storing computer-executable instructions that, when executed on the one or more processors, cause performance of operations comprising:
      receiving a Session Initiation Protocol (SIP) message associated with a user;
      retrieving, from a home subscriber server (HSS), an identifier of a SIP server that is associated with the user;
      querying a domain name system (DNS) server using the identifier;
      receiving a NULL response from the DNS server, the NULL response being indicative of a failure of the SIP server; and
      in response to receiving the NULL response, re-registering the user in order to assign a new SIP server and to restore a wireless communication session.

11. The system of claim 10, wherein re-registering the user comprises storing a first identifier of the new SIP server in the HSS.

12. The system of claim 11, the operations further comprising, prior to storing the first identifier, selecting the first identifier for transmission to the HSS based at least in part on a determination that transmitting the first identifier to the HSS is to occur over a Diameter interface.

13. The system of claim 11, the operations further comprising:
   receiving an additional SIP message associated with the user; and
   inserting a second identifier of the new SIP server in a message header of the additional SIP message.

14. The system of claim 13, the operations further comprising:
   receiving the second identifier from the new SIP server during an Internet Protocol Multimedia Subsystem (IMS) registration procedure associated with the re-registering of the user;
   converting the second identifier to the first identifier; and
   forwarding the first identifier to the HSS for maintaining the first identifier in association with the user.

15. The system of claim 13, wherein the first identifier of the new SIP server comprises a first hostname of the new SIP server, and the second identifier of the new SIP server comprises a second hostname of the new SIP server.

16. The system of claim 10, wherein the identifier comprises a fully qualified domain name (FQDN) corresponding to a domain of a traffic distribution server that is configured to monitor SIP servers of an Internet Protocol Multimedia Subsystem (IMS) for failure conditions, and wherein the DNS server is communicatively coupled to the traffic distribution server and configured to return the NULL response if the traffic distribution server indicates that the SIP server has failed.

* * * * *